United States Patent [19]
Kimura et al.

[11] Patent Number: 4,985,514
[45] Date of Patent: Jan. 15, 1991

[54] METHOD FOR PRODUCTION OF WATER ABSORBENT RESIN

[75] Inventors: Kazumasa Kimura, Osaka; Takumi Hatsuda; Yoshio Irie, both of Himeji; Tadao Shimomura, Toyonaka, all of Japan

[73] Assignee: Nippon Shokubai Kagaku Kogyo Co., Ltd., Osaka, Japan

[21] Appl. No.: 229,988

[22] Filed: Aug. 9, 1988

[30] Foreign Application Priority Data

Aug. 10, 1987 [JP] Japan ............................ 62-198233
Aug. 10, 1987 [JP] Japan ............................ 62-198234

[51] Int. Cl.$^5$ ........................ C08F 2/10; C08F 20/06
[52] U.S. Cl. ........................ 526/88; 526/240; 526/287; 526/930; 525/328.5; 525/330.2; 525/360; 525/366; 525/367; 525/369; 525/378
[58] Field of Search ............ 526/88, 240, 930, 287, 526/240; 525/328.5, 330.2, 360, 366, 367, 369, 378

[56] References Cited

U.S. PATENT DOCUMENTS 4,286,082  8/1981  Tsubakimoto et al. ............ 526/240
4,625,001  11/1986  Tsubakimoto et al. ............ 526/88
4,654,039  3/1987  Brandt et al. .................... 526/207 X
4,833,222  5/1989  Siddall et al. .................... 526/240 X

FOREIGN PATENT DOCUMENTS 0176664    4/1986   European Pat. Off. ............ 526/240
0223063    5/1987   European Pat. Off. ............ 526/88
48-42466   12/1973  Japan ............................ 526/88
56-161408  11/1981  Japan ............................ 526/88
57-34101   2/1982   Japan ............................ 526/88
57-94011   6/1982   Japan ............................ 526/88
57-158209  9/1982   Japan ............................ 526/88
57-198714  12/1982  Japan ............................ 526/88
58-9714    3/1983   Japan ............................ 526/88
59-37003   9/1984   Japan ............................ 526/88

Primary Examiner—Fred Teskin
Attorney, Agent, or Firm—Omri M. Behr

[57] ABSTRACT

The present invention is a method for the production of a water absorbent resin, which comprises preparing a monomer component possessing an ability to form a cross-linked structure and convert itself into a hydrated gel polymer during the course of aqueous solution polymerization, possessing an acid group-containing monomer content of at least 50 mol %, and having 10 to 50 mol % of said acid group-containing monomer neutralized and subjecting said monomer component to aqueous solution polymerization within a reaction vessel having a plurality of rotary shafts each fitted with stirring blades.

24 Claims, No Drawings

METHOD FOR PRODUCTION OF WATER ABSORBENT RESIN

BACKGROUND OF THE INVENTION

1. Field of the Invention:

This invention relates to a method for the production of a water absorbent resin. More particularly, it relates to a method for the production of a water absorbent resin which is excellent in absorption properties.

2. Description of the Prior Art:

As water absorbent resins obtainable by the polymerization of a monomer, cross-linked polyacrylates, saponified acrylic ester-vinyl acetate copolymers, modified cross-linked polyvinyl alcohols, partially neutralized cross-linked polyacrylates, cross-linked isobutylene-maleic anhydride copolymers, and starch-acrylic acid graft copolymer have been known in the art. They are extensively utilized as sanitary absorbents such as sanitary napkins and disposable diapers and as water-retaining agents, dehydrating agents, etc. in the field of agriculture and horticulture and in the field of civil engineering, for example.

Among various methods heretofore available for the production of such water absorbent resins, there resorting to the principle of reverse phase suspension polymerization are disclosed in Japanese Patent Laid-Opens SHO Nos. 56(1981)-161,408, SHO 57(1982)-94,011, SHO 57(1982)-158,209, and SHO 57(1982)-198,714, for example, and those resorting to the principle of aqueous solution polymerization are disclosed in Japanese Patent Laid-Open SHO No. 57(1982)-34,101, Japanese Patent Publication SHO No. 48(1973)-42,466, Japanese Patent Laid-Open SHO No. 58(1983)-49,714, Japanese Patent Publication SHO No. 59(1984)-37,003, U.S. Pat. Nos. 4,286,082, and 4,625,001, for example.

The method of reverse phase suspension polymerization necessitates use of an organic solvent and, therefore, entails disadvantages that the organic solvent not only impair the working environment but also threaten explosion due to flashing. Measures must be taken against these disadvantages. The measures render the operation of reverse phase suspension polymerization expensive together with the expense of the organic solvent itself and the expense for the removal of spent solvent. Further, it has a drawback that since the restriction imposed on solid concentration, the productivity of the operation is degraded. Since this organic solvent tends to remain, though in a minute amount, in the product of reverse phase suspension polymerization, an attempt at ensuring perfect removal of the residual organic solvent from the product renders the method all the more expensive. Moreover, since the absorbent resin produced by the method of reverse phase suspension polymerization is in the form of beads of an unduly small diameter, the resin beads used in disposable diaper, for example, have the possibility of falling off the fibrous absorbent core component such as pulp. This resin suffers inconvenience in handling from the fact that it is in the form of minute beads. Further, the method of reverse phase suspension polymerization entails the disadvantage that when the cross-linking agent of insufficient hydrophilicity is used, this cross-linking agent tends to dissolve out in the hydrophobic organic solvent. Though it is possible to increase the solubility of the cross-linking agent in an aqueous monomer solution by the decrease of the neutralization degree of the monomer solution, when this case, it has a problem that the acid group-containing monomer tend to dissolve out in the hydrophobic organic solvent and induce flocculation.

The method of aqueous solution polymerization suffers from none of the drawbacks mentioned above. Particularly the methods disclosed in Japanese Patent Laid-Open SHO No. 57(1982)-34,101 and U.S. Pat. No. 4,625,001 are those for producing a cross-linked polymer by a procedure which comprises effecting radical aqueous solution polymerization of the aqueous solution of a monomer capable of forming a cross-linked structure in the molecular unit thereof on exposure to aqueous solution polymerization and consequently converting itself into a hydrated gel polymer in combination, with a polymerization initiator in a reaction vessel provided with stirring blades by finely dividing the hydrated gel polymer produced in consequence of the progress of the polymerization with the shearing force of the stirring blades generated by the rotation of the stirring shaft. According to these methods, they enjoy extremely high operational efficiency and also have an advantage that finely divided hydrated gel polymer possessing a cross-linked structure in the molecular unit thereof can be produced with ease. Even in these methods of such characteristic features, it has possibility that the production of an absorbent resin exhibiting a high capacity for absorption and containing water solubles in a small amount is difficult.

It is widely known to persons skilled in the art that the ratio of absorption of a given resin is increased by lowering the density of cross-linking. It is also well known that when a water absorbent resin is produced by a procedure capable of lowering the cross-linking density, the produced water absorbent resin suffers from an increase in the content of water solubles. The water solubles are of such nature that when the water absorbent resin forms a hydrogel structure on contact with various liquids such as water, urine, and body fluid, they are exuded through the hydrogel structure. The water solubles which are thus extracted by the liquids subjected to absorption not only degrades the water absorbent resin's ratio of absorption but also accelerates the deterioration of the water absorbent resin. Moreover, the viscid consistency of the water solubles gives birth to a disadvantage that it excites an unpleasant sensation in the human skin and smears the liquid subjected to absorption.

In the circumstances, the desirability of perfecting a method for the production of a water absorbent resin enjoying a high ratio of absorption and containing water solubles only in a small amount has been finding growing approval. U.S. Pat. No. 4,654,039 discloses a method for producing a water absorbent resin enjoying a high ratio of absorption and containing water insolubles only in a small amount by subjecting a substantially free acid type monomer to aqueous solution polymerization. It has been demonstrated, however, that when an unneutralized monomer is polymerized by the use of a conventional radical polymerization initiator, the amount of residual monomer increases in the produced polymer. Naturally, the increase in the amount of residual monomer is nothing to be desired from the standpoint of safety.

An object of this invention, therefore, is to provide a novel method for the production of a water absorbent resin.

Another object of this invention is to provide a method for the production of a water absorbent resin excelling in absorption properties and containing an residual monomer only in a small amount.

SUMMARY OF THE INVENTION

The objects described above are accomplished by a method (first method) for the production of a water absorbent resin, which comprises preparing a monomer component possessing an ability to form a cross-linked structure and convert itself into a hydrated gel polymer during the course of aqueous solution polymerization, possessing an acid group-containing monomer content of at least 50 mol %, and having 10 to 50 mol % of the acid group-containing monomer neutralized and subjecting the monomer component to aqueous solution polymerization within a reaction vessel having a plurality of rotary shafts each fitted with stirring blades.

These objects are also accomplished by a method (second method) for the production of a water absorbent resin, which comprises preparing a monomer component possessing an ability to form a cross-linked structure and convert itself into a hydrated gel polymer during the course of aqueous solution polymerization, possessing an acid group-containing monomer content of at least 50 mol %, and having 10 to 50 mol % of the acid group-containing monomer neutralized, subjecting the monomer component to aqueous solution within a reaction vessel having a plurality of rotary shafts each fitted with stirring blades, and adding at least one neutralizing agent selected from the group consisting of basic substances and salts of weak acids to the resultant hydrated gel polymer thereby adjusting the ratio of neutralization of the polymer to at least 50 mol %.

DESCRIPTION OF PREFERRED EMBODIMENT

The acid group-containing monomer to be used in the present invention is a monomer which possesses a carboxylic acid group and/or a sulfonic acid group in the molecule thereof. Typical examples of the monomer include (meth)acrylic acids, crotonic acid, maleic acid, fumaric acid, itaconic acid, 2-acrylamide-2-methylpropanesulfonic acid, 2-(meth)acryloyl ethanesulfonic acids, 2-(meth)acryloyl propanesulfonic acids, and vinyl benzene-sulfonic acid. One member or a mixture of two or more members selected from among the typical examples cited above may be used in the present invention. Among other acid group-containing monomers mentioned above, (meth)acrylic acids, 2-acrylamide-2-methylpropanesulfonic acid, and 2-(meth)acryloyl ethanesulfonic acids prove to be desirable and acrylic acid proves to be particularly desirable.

The monomer component in the present invention contains 50 to 100 mol %, preferably 75 to 100 mol %, of the acid group-containing monomer mentioned above. It may contain other kinds of monomer (a) not qualifying as the acid group-containing monomer in an amount of less than 50 mol %, preferably less than 25 mol %. The other kinds of monomer (a) usable herein has no particular restriction except for the sole requirement that it should be copolymerizable with the acid group-containing monomer. For the purpose of avoiding possible impairment of the absorption properties of the produced water absorbent resin, the other monomer (a) to be used is preferable to be formed mainly of monomers of high hydrophilicity. Of the monomers (a), those of high hydrophilicity include (meth)acrylamides, 2-hydroxyethyl (meth)acrylates, polyethylene glycol mono(meth)acrylates, (meth)acrylonitriles, and methyl acrylate, for example. One member or a mixture of two or more members selected from among the monomers cited above may be used herein.

The water absorbent resin to which the method of the present invention is applied is of such a type as to form a cross-linked structure during the course of aqueous solution polymerization. The formation of this cross-linked structure can be effected by any of the various methods known to the art. As typical examples of such known methods, there can be cited:

(1) A method which comprises having a cross-linking monomer incorporated in advance in the monomer component thereby enabling the monomer component to form a cross-linked structure by virtue of a radical polymerization reaction during the course of aqueous solution polymerization. The cross-linking monomer usable herein has no particular restriction except for the requirement that it should possess at least two polymerizing double bonds within the molecular unit thereof. It is, however, required to exhibit a certain degree of solubility in water, possess sufficient copolymerizability with the acid group-containing monomer mentioned above, and acquire a cross-linked structure efficiently and produce uniform cross-linking distribution.

Examples of the cross-linking monomer include diacrylates and dimethacrylates of ethylene glycol, diethylene glycol, triethylene glycol, propylene glycol, 1,4-butane diol, 1,5-pentane diol, 1,6-hexane diol, neopentyl glycol, trimethylol propane, and pentaerythritol; triacrylates and trimethacrylates of trimethylol propane and pentaerythritol; tetraacrylate and tetramethacrylate of pentaerythritol, N,N'-methylenebisacrylamide, N,N'-methylenebismethacrylamide, triallyl isocyanurate, and triallylamine. One member or a mixture of two or more members selected from among the cross-linking monomers mentioned above may be used herein.

The amount of the cross-linking monomer to be used herein is in the range of 0.001 to 5 mol %, preferably 0.002 to 2 mol %, based on the amount of the monomer component mentioned above. If this amount is less than 0.001 mol %, the amount of water solubles is extremely large, though the ratio of absorption is sufficiently large. If this amount exceeds 5 mol %, the produced absorbent resin exhibits an insufficient ratio of absorption.

(2) A method which comprises subjecting the monomer component to aqueous solution polymerization in the presence of a hydrophilic macromolecular compound such as starch, cellulose, or polyvinyl alcohol, for example, thereby enabling the monomer component to form a cross-linked structure originating in graft bonding during the course of the aqueous solution polymerization. Preferably, the amount of the hydrophilic macromolecular compound to be used is in the range of 0.1 to 50% by weight, preferably 1 to 30% by weight, based on the amount of the monomer component.

(3) A method which comprises having the monomer component incorporated in advance therein a cross-linking agent possessing in the molecular unit thereof at least two groups reactive with such functional groups as acid group, hydroxyl group, and amide group possessed by the monomer component thereby enabling the monomer component to form a cross-linked structure due to a cross-linking reaction during the course of the aqueous solution polymerization. Examples of the cross-linking agent usable in this method include polyisocyanate compounds, polyepoxy compounds, polyamine compounds, and polyoxazoline compounds. These cross-linking agents may be used either singly or in the form of a mixture of two or more members. The amount of the cross-linking agent to be used is in the range of 0.001 to 50% by weight, preferably 0.002 to 30% by weight, based on the amount of the monomer component. If this amount is less than 0.001% by weight, the amount of water solubles is unduly large, though the ratio of absorption is sufficiently large. If this amount exceeds 50% by weight, the produced absorbent resin acquires a small ratio of absorption.

(4) A method which comprises having the monomer component incorporated in advance therein a polyvalent metal compound thereby enabling the monomer component to form a cross-linked structure due to ionic cross-linking reaction during the course of the aqueous solution polymerization. Examples of the polyvalent metal compound to be used in this method include hydroxides and salts of zinc, calcium, aluminum, and zirconium. These polyvalent metal compounds may be used either singly or in the form of a mixture of two or more members. The polyvalent metal compound possesses an ability to neutralize the acid group in the monomer component with the polyvalent metal ion thereof. The amount of the polyvalent metal compound to be incorporated must be such that the ratio of neutralization of the acid group-containing monomer which has an extremely important significance for the present invention will not deviate from the range of 10 to 50 mol %.

From among the methods described above, that which is actually used is to be selected to suit the purpose for which the produced absorbent resin is intended. It is permissible to use two or more of these methods in a combined form when necessary. For the present invention, it is advantageous to effect the formation of the cross-linked structure by the method of (1) in terms of the capacity for absorption to be exhibited by the produced absorbent resin.

Of the methods contemplated by this invention for the production of the water absorbent resin, the first method is accomplished by having 10 to 50 mol %, preferably 10 to 40 mol %, of the acid group-containing monomer in the monomer component neutralized in advance of subjecting the monomer component to aqueous solution polymerization. The fact that the ratio of neutralization of the acid group-containing monomer is limited to the range mentioned above has a truly profound significance. If the ratio of neutralization of the acid group-containing monomer is less than 10 mol %, the amount of residual monomer in the polymerization carried out with the conventional radical polymerization initiator is unduly large. Conversely if the ratio of neutralization of the acid group-containing monomer exceeds 50 mol %, it is difficult to obtain an absorbent resin possessing a high ratio of absorption and containing water solubles in a sufficiently small amount.

Hydroxides of alkali metals and ammonia are available for the aforementioned neutralization of the acid group-containing monomer. It is particularly preferable to use the hydroxide of an alkali metal for this neutralization. Typical examples of the hydroxide of alkali metal are sodium hydroxide, potassium hydroxide, and lithium hydroxide. It is particularly advantageous to use sodium hydroxide or potassium hydroxide from the standpoint of commercial availability, price, and safety. The monomer component having the acid group-containing monomer thereof is polymerized in aqueous solution, preferably in a concentration in the range of 5 to 50% by weight, more preferably 10 to 45% by weight. If the concentration of the monomer component in the aqueous solution polymerization is less than 5% by weight, the operation is not economical in terms of productivity because the polymerization takes up an unduly long time for its completion. If this concentration exceeds 50% by weight, there is possibility that the heat of polymerization reaction is not easily removed, the peak temperature of polymerization is high, and the produced water absorbent resin is suffered to contain water solubles in a rather large amount.

As the polymerization methods for carrying out the polymerization of the present invention, there can be cited a radical polymerization method, and a polymerization method by the use of activated energy ray, for example. For the purpose of obtaining a water absorbent resin exhibiting outstanding property, the radical polymerization is preferable. The polymerization initiator to be used in the radical polymerization may be any of the water-soluble radical polymerization initiators heretofore known to the art. Examples of such water-soluble radical polymerization initiator include persulfates, hydrogen peroxide, and water-soluble azo compounds. They may be used singly. Otherwise, they may be used suitably in combination with sulfites, hydrogen sulfites, thiosulfates, L-ascorbic acid, ferrous salts, etc. so as to serve as redox initiators.

The amount of the polymerization initiator to be used herein is not specifically limited, but generally, is not more than 5 mol %, preferably falling in the range of 0.001 to 1 mol %, based on the amount of the monomer component. If the amount of the polymerization initiator exceeds 5 mol %, the polymerization entails undesirable effects such as an increase in the amount of water solubles.

A typical procedure which is followed in the performance of the aqueous solution polymerization in accordance with the method of the present invention comprises the aqueous solution of the monomer component capable of forming a cross-linked structure during the course of the aqueous solution polymerization in a reaction vessel like a lidded kneader provided with a plurality of rotary stirring shafts each fitted with stirring blades as illustrated in Japanese Patent Laid-Open SH No.057(1982)-34,101, optionally displacing the entrapped air inside the reaction vessel with an inert gas such as nitrogen, adding a polymerization initiator to the polymerization system, initiating aqueous solution polymerization of the polymerization system either at normal room temperature or a temperature elevated to a level in the range of 30° to 70° C., and finely dividing the hydrated gel polymer being formed during the course of the aqueous solution polymerization with the shearing force generated by the rotation of the plurality of rotary stirring shafts until completion of the polymerization. Of course, the aqueous solution polymerization to carry out the present invention is not restricted by this particular example of procedure. This typical procedure, however, constitutes itself the best mode of embodying the method of this invention in bringing about the expected effect with full efficiency though it may be carried out following the procedure of continuous polymerization disclosed in U.S. Pat. No. 4,625,001. When the aqueous solution polymerization is carried out by following this procedure, it produced inside the reaction vessel a finely divided hydrated gel polymer having a cross-linked structure in the individual particles thereof cross-linked by the cross-linking agent. Though the average diameter of the particles is variable with the reaction conditions, it is generally not more than 3 cm. The produced hydrated gel polymer particles exhibit only insignificant adhesion among themselves, enjoy very easy separation from the inner wall of the polymerization vessel, possess highly satisfactory flowability, and ensure great ease of handling when they are to be removed from the polymerization vessel or to be dried. The removal of the gel polymer particles from the polymerization vessel, therefore, can be easily attained by tilting or turning upside down the polymerization vessel thereby allowing the particles to flown down spontaneously or by providing the polymerization vessel in the bottom part thereof with a screw adapted exclusively for expulsion of the particles.

The vessel provided with the plurality of rotary stirring shafts and used for this invention is required to be capable of imparting rotation to the rotary stirring shafts each fitted with stirring blades thereby exerting shearing force upon the hydrated gel polymer to be produced when the monomer is subjected to the aqueous solution polymerization. The provision of a plurality of rotary stirring shafts is an indispensable requirement. Typical examples of the device which satisfies this requirement include a twin-arm kneader (hereinafter referred to simply as "kneader") and a triple-arm kneader. The kneader is used by rotating the two rotary stirring shafts in mutually opposite directions at an equal speed or at different speeds. When the two rotary stirring shafts are rotated at an equal speed, the kneader is used in such a state that the radii of rotation of the two rotary stirring shafts will partly overlap. When they are rotated at different speeds, the kneader is used in such a state that the radii mentioned above will avoid overlapping. The rotary stirring shafts may be of any of the conventional types such as, for example, sigma type, S type, Banbury type, and fishtail type.

Of the methods contemplated by the present invention for the production of an absorbent resin, the second method is attained by having 10 to 50 mol %, preferably 10 to 40 mol %, of the acid group-containing monomer in the monomer component neutralized in advance of subjecting the monomer component to aqueous solution polymerization and subsequently adding basic substances and/or the salts of weak acids to the resultant hydrated gel polymer thereby adjusting the ratio of neutralization of the polymer to at least 50 mol %, preferably to a level in the range of 60 to 100 mol %. By carring out this second method, the water absorbent resin which is consequently obtained excels in absorption properties as evinced particularly by a high ratio of absorption.

As the basic substance to be used for the neutralization, it may be any of the basic substances heretofore accepted for the purpose of neutralization. Generally, hydroxides of alkali metals are especially suitable. Typical examples of the hydroxide of alkali metal are sodium hydroxide, potassium hydroxide, and lithium hydroxide. The process which comprises polymerizing a monomer component containing an acid group-containing monomer and neutralizing the produced polymer with a substance exhibiting basicity such as, for example, the hydroxide of an alkali metal has been known to the art. It has been found that when the monomer component having the acid group-containing monomer unneutralized is polymerized by the use of an ordinary radical polymerization intiator, the produced polymer contains residual monomer in a large amount. The water absorbent polymer excelling in absorption properties and containing residual monomer only in a small amount is obtained only when the production is carried out by the method of this invention, namely subjecting the monomer component having the acid group-containing monomer neutralized in advance to a ratio falling in the specific range to aqueous solution polymerization and subsequently adding to the resultant hydrated gel polymer the basic substance thereby adjusting the ratio of neutralization of the polymer to a level falling in the specified range.

Further, during the course of polymerizing the monomer component containing the acid group-containing monomer and subsequently neutralizing the produced hydrated gel polymer, it is necessary for the purpose of uniformizing the neutralization to divide finely the hydrated gel polymer and consequently enable the resultant polymer particles to acquire sufficiently large surface area and contact amply with the basic substance. In accordance with the method of this invention, the water absorbent resin excelling in absorption properties and containing residual monomer only in a small amount is obtained by subjecting the monomer component having the acid group-containing monomer thereof neutralized in advance to a ratio falling in the specified range to aqueous solution polymerization. Then, by adding the basic substance to the hydrated gel polymer for the purpose of maximizing the water absorbent resin's ratio of absorption, the necessary adjustment of the ratio of neutralization of the polymer to at least 50 mol % can be attained with ease. The adjustment of the ratio of neutralization by the addition of the basic substance is easy because the hydrated gel polymer obtained after completion of the aqueous solution polymerization is in the form of minute particles.

The salt of weak acid to be used alternatively for the neutralization may be any of the salts of inorganic and organic weak acids heretofore used for the neutralization of this kind. Typical examples of the salt of weak acid include ammonium carbonate, sodium carbonate, potassium carbonate, potassium sodium carbonate, ammonium hydrogen carbonate, sodium hydrogen carbonate, potassium hydrogen carbonate, ammonium phosphate, sodium phosphate, potassium phosphate, ammonium phosphate, sodium phosphate, potassium phosphate, ammonium borate, sodium borate, potassium borate, ammonium oxalate, sodium oxalate, potassium oxalate, ammonium acetate, sodium acetate, and potassium acetate. These salts of weak acids may be used either singly or in the form of a mixture of two or more members. Among other salts of weak acids cited above, the carbonates prove to be particularly desirable because they are easily obtained commercially and they excel in efficiency of neutralization. Such strong alkali salts of carbonic acid as sodium carbonate, potassium carbonate, sodium hydrogen carbonate, and potassium hydrogen carbonate probe to be especially desirable.

When the second method of the present invention is carried out, the neutralization is carried out by the addition of a neutralizing agent selected from the group consisting of basic substances and salts of weak acids. Particularly, the use of the salts of weak acids is preferable since neutralization can be carried out with ease and convenience as described below. The salt of weak acid may be added in the form of an aqueous solution or a slurry. Otherwise, it may be thrown in directly in a particulate form such as powder or granules. In accordance with the method of this invention, the hydrated gel polymer is finely divided sufficiently and the finely divided hydrated gel polymer is mixed thoroughly with the salt of weak acid. Thus, the neutralization of the acid group-containing hydrated gel polymer can be attained even when the salt of weak acid is directly added in its original form of powder or a slurry, i.e. in a form not undergone any extra treatment for conversion into an aqueous solution. Further since the finely divided hydrated gel polymer is thoroughly mixed as described above, the manner in which the salt of weak acid is directly added in its original form of powder or as a slurry need not be particularly uniformized.

Though the time which intervenes between the time the salt of weak acid is added and the time the neutralization reaches the prescribed ratio is variable with the average particle diameter of the hydrated gel polymer, the amount of the acid group, etc., it is generally in the range of 10 to 60 minutes. This neutralization can be expedited by closing the reaction vessel with its lid after the salt of weak acid has been placed therein, elevating the temperature of the reaction system thereby accelerating the evaporation of water from the hydrated gel polymer, and steaming the system.

As compared with the method which effects the neutralization by addition of an alkaline substance in the form of an aqueous solution, the method of neutralization contemplated by using the salt of weak acid entails no loss of the solid content of the hydrated gel polymer and obviates the necessity for the cost of the drying which would be otherwise required subsequently. A method of neutralization, namely the method which effects the neutralization by the use of a strongly alkaline substance such as sodium hydroxide or potassium hydroxide, has a possibility that the points of cross-linking forming a cross-linked structure are severed by hydrolysis and, consequently, the produced polymer suffers from degradation of physical properties. In contrast, the neutralization by the use of the salt of weak acid does not entail any disadvantage of this nature.

When a carbonate is used as the salt of weak acid, it has effects that the acid radical comes into the carbon dioxide gas which may be easily removed from the hydrated gel polymer, as well as the efficiency of drying can be notably hightened.

Even after the neutralization is completed by the addition of the basic substances and/or the salts of weak acids in accordance with the method of this invention, the hydrated gel polymer particles yield sparingly to mutual adhesion, separate very smoothly from the inner wall of the polymerization vessel and the stirring blades, exhibit high flowability, and permit great ease of handling when they are to be removed from the polymerization vessel or to be dried. The removal of the gel polymer particles after neutralization from the polymerization vessel, therefore, can be easily attained by tilting or turning upside down the polymerization vessel and allowing the polymer particles to flow down spontaneously or providing the polymerization vessel in the bottom part thereof with a screw adapted exclusively for expulsion of the polymer particles.

Now, the present invention will be described more specifically below with reference to working examples and controls. It should be noted, however, that the scope of this invention is not restricted by these examples. Wherever percents and parts are mentioned in the examples and controls, they are meant as percents and parts by weight unless otherwise specified.

The magnitudes of the ratio of absorption, the water solubles, and the residual monomer indicated in these examples represent the numerical values determined by the following methods of test.

A: Ratio of absorption

This property was determined by uniformly placing a 0.2g of a sample polymer in a bag of non-woven fabric (40 mm × 150 mm) resembling a teabag, keeping the bag immersed in an aqueous 0.9% sodium chloride solution for 30 minutes, checking the weight of the wet bag, and calculating the following formula, using the found weight.

$$\text{Ratio of absorption} = \frac{\left(\begin{array}{c}\text{Weight after} \\ \text{absorption (g)}\end{array}\right) - \text{Blank (g)}}{\text{Weight of polymer (g)}}$$

B: Water solubles

This property was determined by dispersing 0.5 g of a sample polymer in 1,000 ml of deionized water, keeping the resultant dispersion stirred for 12 hours, passing the stirred dispersion through a filter paper, taking the weight of the solid content of the filtrate, and calculating the following formula, using the found weight.

$$\text{Content of water solubles (\%)} = \frac{(\text{Weight of filtrate}) \times (\text{Solid content of filtrate})(\%)}{0.5}$$

C: Residual monomer

This property was determined by dispersing 1.0 g of a sample polymer in 1,000 ml of distilled water, keeping the dispersion stirred for two hours, passing the stirred dispersion through a Whatman filter paper, and analyzing the filtrate by liquid chromatography.

EXAMPLE 1

A jacketed stainless steel twin-arm kneader measuring 2 liters in inner volume, 160 mm × 150 mm in the opening part, and 135 mm in depth and provided with two sigma type blades 70 mm in diameter of rotation was covered with a lid. The kneader was charged with an aqueous solution of a monomer component (concentration of aqueous solution 30%) containing 300 g of acrylic acid having 30 mol % thereof neutralized with caustic soda, 0.88 g of N,N'-methylenebisacrylamide (0.15 mol % based on the partially neutralized acrylic acid), and 700 g of water and then blown with nitrogen gas to displace the air entrapped in the reaction system. Then, the two sigma type baldes were rotated severally at speeds of 67 and 56 r.p.m. and the kneader was heated by passing warm water at 35° C. through the jacket and 0.38 g of ammonium persulfate and 0.38 g of sodium hydrogen sulfite were added as a polymerization initiator. The monomer component began to polymerize 12 minutes after the addition of the polymerization initiator. After 30 minutes following the addition of the polymerization initiator, the temperature inside the reaction system reached 61° C. and the hydrated gel polymer was finely divided into minute particles about 5 mm in diameter. The stirring was further continued. After the polymerization was continued for 45 minutes, the lid was removed from the kneader and the gel withdrawn from the kneader.

The minute particles of the hydrated gel polymer consequently obtained were spread on a 50-mesh metalgauge and dried with hot air at 150° C. for one hour. The water content in the dried particles was 11%. The dried particles were crushed with a shaking mill. The powder consequently obtained (hereinafter referred to as "water absorbent resin (1)") was tested for ratio of absorption, content of water solubles, and residual monomer. The results are shown in Table 1.

EXAMPLE 2

Polymerization was carried out by using the same composition and following the same procedure as in Example 1. The monomer component began to polymerize 11 minutes after the addition of the polymerization initiator. After the polymerization was continued for 29 minutes after the addition of the polymerization initiator, the temperature in the reaction system reached 62° C. and the hydrated gel polymer was finely divided into minute particles about 5 mm in diameter. The lid was removed from the kneader and 143 g of an aqueous 48% sodium hydroxide solution was added into the kneader through the opening over a period of five minutes (with the ratio of neutralization of the polymer brought to 75 mol %). The lid was replaced to close the opening and the stirring was continued. After 45 minutes following the start of the polymerization, the lid was removed to expose the opening and a phenolphthalein solution was added dropwise to the polymerization system in the kneader. No coloration in red was recognized at any point.

The minute particles of the hydrated gel polymer were spread on a 50-mesh metal gauze and dried with hot air at 150° C. for one hour. The water content in the dried particles was 11%. The dried particles were crushed with a shaking mill. The powder consequently obtained (hereinafter referred to as "water absorbent resin (2)") was tested for ratio of absorption, content of water solubles, and residual monomer. The results are shown in Table 1.

EXAMPLE 3

Polymerization was carried out by using the same composition and following the same procedure as in Example 1. After a similar finely divided minute particles of Example 1 were obtained, lid was removed and powdered anhydrous sodium carbonate was added into the kneader through the opening over a period of 10 minutes (with the ratio of neutralization of the polymer brought to 75 mol %). The lid was replaced to close the opening. After the stirring was continued for 20 minutes, the lid was removed to expose the opening and a phenolphthalein solution was added dropwise to the polymerization system in the kneader. No coloration in red was recognized at any point.

The minute particles of the hydrated gel polymer were spread on a 50-mesh metal gauze and dried with hot air at 150° C. for one hour. The water content in the dried particles was 2%. The dried particles were crushed with a shaking mill. The powder consequently obtained (hereinafter referred to as "water absorbent resin (3)") was tested for ratio of absorption, content of water solubles, and residual monomer. The results are shown in Table 1.

Control 1

Polymerization was carried out by following the procedure of Example 1, except that a mixture containing 300 g of completely non-neutralized acrylic acid and 0.96 g of N,N'-methylenebisacrylamide (0.15 mol % based on acrylic acid) was used as a monomer component and 0.42 g of ammonium persulfate and 0.42 g of sodium hydrogen sulfite were used as a polymerization initiator. The monomer component began to polymerize 18 minutes after the addition of the polymerization initiator. After the polymerization was continued for 33 minutes after the addition of the polymerization initiator, the temperature inside the reaction system reached 66° C. and the hydrated gel polymer was finely divided into minute particles about 5 mm in diameter. The stirring was continued. After 45 minutes following the start of the polymerization, the lid was removed and the gel withdrawn from the kneader.

The minute particles of the hydrated gel polymer consequently obtained were spread on a 50-mesh metal gauze and dried with hot air at a temperature of 150° C. for one hour. The water content in the dried particles was 13%. The dried particles obtained (hereinafter referred to as "comparative water absorbent resin (1)") was tested for ratio of absorption, content of water solubles, and residual monomer. The results are shown in Table 1.

Control 2

Polymerization was carried out by using the same composition and following the same procedure as in Control 1. The monomer component began to polymerize 16 minutes after the addition of the polymerization initiator. After the polymerization was continued for 29 minutes after the addition of the polymerization initiator, the temperature inside the reaction system reached 69° C. and the hydrated gel polymer was finely divided into minute particles about 5 mm in diameter. The lid was removed to expose the opening and 260 g of an aqueous 48% sodium hydroxide solution was added to the kneader over a period of 10 minutes (with the ratio of neutralization of the polymer brought to 75 mol %). The lid was replaced to close the opening and the stirring was continued. After 45 minutes following the start of the polymerization, the lid was removed and a phenolphthalein solution was added dropwise to the polymerization system. No coloration in red was recognized at any point.

The minute particles of the hydrated gel polymer consequently obtained were spread on a 50-mesh metal gauze and dried with hot air at a temperature of 150° C. for one hour. The water content in the dried particles was 10%. The dried particles were crushed with a shaking mill. The powder consequently obtained (hereinafter referred to as "comparative water absorbent resin (2)") was tested for ratio of absorption, content of water solubles, and residual monomer. The results are shown in Table 1.

Control 3

Polymerization was carried out by following the procedure of Example 1, except that a mixture containing 300 g of acrylic acid having 75 mol % thereof neutralized with caustic soda and 0.78 g of N,N'-methylenebisacrylamide with caustic soda and 0.78 g of N,N'-methylenebisacrylamide (0.15 mol % based on the partially neutralized acrylic acid) was used as a monomer component and 0.34 g of ammonium persulfate and 0.34 g of sodium hydrogen sulfite were used as a polymerization initiator instead. The monomer component began to polymerize 10 minutes after the addition of the polymerization initiator. After the polymerization was continued for 30 minutes following the addition of the polymerization initiator, the temperature inside the reaction system reached 58° C. and the hydrated gel polymer was finely divided into minute particles about 5 mm in diameter. The stirring was further continued. After 40 minutes following the start of the polymerization, the lid was removed and the hydrated gel polymer withdrawn from the kneader.

The minute particles of the hydrated gel polymer consequently obtained were spread on a 50-mesh metal gauze and dried with hot air at a temperature of 150° C. for one hour. The water content in the dried particles was 8%. The dried particles crushed similarly to Example 1. The resultant powder (hereinafter referred to as "comparative water absorbent resin (3)") was tested for ratio of absorption, content of water solubles, and residual monomer. The results are shown in Table 1.

EXAMPLE 4

The same kneader as in Example 1 was charged with an aqueous solution of a monomer component (concentration of aqueous solution 30%) containing 300 g of acrylic acid having 20 mol % thereof neutralized with caustic soda, 1.74 g of trimethylolpropanetriacrylate (0.15 mol % based on the partially neutralized acrylic acid), and 700 g of water and then conducted a polymerization similar to Example 1.

After 35 minutes following the addition of the polymerization initiator, the temperature inside the reaction system reached 64° C. and the hydrated gel polymer was finely divided into minute particles about 5 mm in diameter. The lid was removed from the kneader and 196 g of an aqueous 48% sodium hydroxide solution was added into the kneader through the opening over a period of five minutes (with the ratio of neutralization of the polymer brought to 80 mol %). The lid was replaced to close the opening and the stirring was continued. After 60 minutes following the addition of the polymerization initiator, the lid was removed to expose the opening and a phenolphthalein solution was added dropwise to the polymerization system in the kneader. No coloration in red was recognized at any point.

The minute particles of the hydrated gel polymer were spread on a 50-mesh metal gauze and dried with hot air at 150° C. for one hour. The water content in the dried particles was 9%. The dried particles were crushed with a shaking mill. The powder consequently obtained (hereinafter referred to as "water absorbent resin (4)") was tested for ratio of absorption, content of water solubles, and residual monomer. The results are shown in Table 1.

EXAMPLE 5

The polymerization was carried out by following the procedure of Example 4, except that 200 g of an aqueous 59.5% sodium carbonate slurry was used to be conducted a neutralization in place of 196 g of an aqueous 48% sodium hydroxide.

The minute particles of the hydrated gel polymer consequently obtained were spread on a 50-mesh metal gauze and dried with hot air at 150° C. for one hour. The water content in the dried particles was 3%. The dried particles were crushed with a shaking mill. The powder consequently obtained (hereinafter referred to as "water absorbent resin (5)") was tested for ratio of absorption, content of water solubles, and residual monomer. The results are shown in Table 1.

EXAMPLE 6

A jacketed stainless steel twin-arm kneader measuring 10 liters inner volume, 240 mm×220 mm in the opening part, and 260 mm in depth and provided with two sigma type blades 110 mm in diameter of rotation was covered with a lid. This kneader was charged with an aqueous solution of a monomer component containing 1,800 g of acrylic acid and methacrylic acid (the molar ratio of acrylic to methacrylic acid 3 1) each having 15 mol % thereof neutralized with caustic soda, 2.1 g of N,N'-methylenebisacrylamide (0.06 mol %, based on the partially neutralized acid group-containing monomer), and 3,200 g of water and then blown with nitrogen gas to displace the air entrapped inside the reaction system. Then, the two sigma type blades were severally rotated at 44 and 24 r.p.m., the kneader was heated by passing warm water at 40° C. through the jacket, and 6.5 g of an aqueous 35% hydrogen peroxide solution, 2.7 g of L-ascorbic acid, and 1.1 g of ammonium persulfate were added as a polymerization initiator. The monomer component began to polymerize one minute after the addition of the polymerization initiator. After 15 minutes following the addition of the polymerization initiator, the temperature inside the reaction system reached 89° C. and the hydrated gel polymer was finely divided into minute particles about 4 mm in diameter. The lid was removed to expose the opening and 1,085 g of an aqueous 48% sodium hydroxide was added through the opening into the kneader over a period of 15 minutes (with the ratio of neutralization of the polymer brought to 72 mol %). The lid was replaced to close the opening and the stirring was further continued. After 40 minutes following the start of the polymerization, the lid was removed and a phenolphthalein solution was added dropwise to the polymerization system inside the kneader. No coloration in red was recognized at any point.

The minute particles of the hydrated gel polymer consequently obtained were placed on a 50-mesh metal gauze and dried with hot air at a temperature of 150° C. for one hour. The water content in the dried particles was 8%. The dried particles were crushed with a shaking mill. The resultant powder (hereinafter referred to as "water absorbent resin (6)") was tested for ratio of absorption, content of water solubles, and residual monomer. The results are shown in Table 1.

EXAMPLE 7

Polymerization was carried out by following the procedure of Example 6, except that a mixture containing 1,800 g of acrylic acid and 2-acrylamide-2-methlpropanesulfonic acid (the molar ratio of acrylic acid to 2-acrylamide-2-methylpropanesulfonic acid 4:1) each having 50 mol % thereof neutralized with caustic soda, and 1.5 g of N,N'-methylenebisacrylamide (0.06 mol %, based on the partially neutralized acid group-containing monomer) was used as a monomer component and 4.6 g of an aqueous 35% hydrogen peroxide solution, 1.9 g of L-ascorbic acid, and 0.8 g of ammonium persulfate were used as a polymerization initiator. The monomer component began to polymerize one minute after the addition of the polymerization initiator. After the polymerization was continued for 18 minutes following the addition of the polymerizaiton initiator, the temperature inside the reaction system reached 80° C. and the hydrated gel polymer was finely divided into minute particles about 4 mm in diameter. The lid was removed to expose the opening and 174 g of a powdered anhydrous sodium carbonate solution was added through the opening into the kneader over a period of 10 minutes (with the ratio of neutralization of the polymer brought to 70 mol %). The lid was replaced to close the opening. After stirring was further continued for 20 minutes, the lid was removed and a phenolphthalein was added dropwise to the polymerization system inside the kneader. No coloration in red was recognized at any point.

The minute particles of the hydrated gel polymer consequently obtained were placed on a 50-mesh metal gauze and dried with hot air at a temperature of 150° C. for one hour. The water content in the dried particles was 2%. The dried particles were crushed with a shaking mill. The resultant powder (hereinafter referred to as "water absorbent resin (7)") was tested for ratio of absorption, content of water solubles, and residual monomer. The results are shown in Table 1.

TABLE 1

| Absorbent | Ratio of absorption (g/g) | Content of water solubles (wt %) | Residual monomer (ppm) | Content of water (wt %) |
|---|---|---|---|---|
| Water absorbent resin | | | | |
| (1) | 44 | 7.0 | 750 | 11 |
| (2) | 55 | 6.0 | 800 | 9 |
| (3) | 55 | 5.9 | 800 | 2 |
| Comparative water absorbent resin | | | | |
| (1) | 10 | 5.8 | 11500 | 13 |
| (2) | 56 | 6.2 | 12000 | 10 |
| (3) | 54 | 14.0 | 750 | 8 |
| Water absorbent resin | | | | |
| (4) | 55 | 9.7 | 770 | 9 |
| (5) | 59 | 5.3 | 770 | 3 |
| (6) | 61 | 8.0 | 840 | 8 |
| (7) | 58 | 7.4 | 720 | 2 |

What is claimed is:

1. A method for the production of a water absorbent resin, which comprises preparing a monomer component possessing an ability to form a cross-linked structure and convert itself into a hydrated gel polymer during the course of aqueous solution polymerization, possessing an acid group-containing monomer content of at least 50 mol %, and having 10 to 50 mol % of said acid group-containing monomer neutralized and subjecting said monomer component to aqueous solution polymerization within a reaction vessel having a plurality of rotary stirring shafts each fitted with stirring blades.

2. A method according to claim 1, wherein said acid group-containing monomer has 10 to 40 mol % thereof neutralized.

3. A method according to claim 1, wherein said polymerization is carried out while the hydrated gel polymer formed during the course of said polymerization is finely divided by the shearing force generated by the rotation of said stirring shafts.

4. A method according to claim 3, wherein said reaction vessel provided with said plurality of rotary shafts is a twin-arm type kneader.

5. A method according to claim 1, wherein said acid group-containing monomer is a monomer containing at least one acid group selected from the class consisting of carboxylic acid groups and sulfonic acid groups.

6. A method according to claim 5, wherein said acid group-containing monomer is at least one monomer selected from the group consisting of (meth)acrylic acids, 2-acrylamide-2-methyl propane-sulfonic acid, and 2-(meth)acryloyl ethanesulfonic acids.

7. A method according to claim 6, wherein said acid group-containing monomer is acrylic acid.

8. A method according to claim 1, wherein said monomer component has a concentration in water in the range of 5 to 50% by weight.

9. A method according to claim 6, wherein said monomer component contains 0.001 to 5 mol %, based on said monomer component, of a cross-linking monomer possessing at least two polymerizable double bonds in the molecule thereof.

10. A method for the production of an water absorbent resin, which comprises preparing a monomer component possessing an ability to form a cross-linked structure and convert itself into a hydrated gel polymer during the course of aqueous solution polymerization, possessing an acid group-containing monomer content of at least 50 mol %, and having 10 to 50 mol % of said acid group-containing monomer neutralized, subjecting said monomer component to aqueous solution polymerization within a reaction vessel having a plurality of rotary stirring shafts each fitted with stirring blades, and adding at least one neutralizing agent selected from the group consisting of basic substances and salts of weak acids to the resultant hydrated gel polymer thereby adjusting the ratio of neutralization of said polymer to at least 50 mol %.

11. A method according to claim 10, wherein said acid group-containing monomer has 10 to 40 mol % thereof neutralized.

12. A method according to claim 10, wherein said polymerization is carried out while the hydrated gel polymer formed during the course of said polymerization is finely divided by the shearing force generated by the rotation of said stirring shafts.

13. A method according to claim 12, wherein said reaction vessel provided with said plurality of rotary shafts is a twin-arm type kneader.

14. A method according to claim 10, wherein said acid group-containing monomer is a monomer containing at least one acid group selected from the class consisting of carboxylic acid groups and sulfonic acid groups.

15. A method according to claim 14, wherein said acid group-containing monomer is at least one monomer selected from the group consisting of (meth)acrylic acids, 2-acrylamide-2-methylpropanesulfonic acid, and 2-(meth)acryloyl ethanesulfonic acids.

16. A method according to claim 16, wherein said acid group-containing monomer is acrylic acid.

17. A method according to claim 10, wherein said monomer component has a concentration in water in the range of 5 to 50% by weight.

18. A method according to claim 14, wherein said monomer component contains 0.001 to 5 mol %, based on said monomer component, of a cross-linking monomer possessing at least two polymerizable double bonds in the molecule thereof.

19. A method according to claim 10, wherein said neutralization of the acid group of said hydrated gel polymer is effected within said reaction vessel provided with said plurality of rotary stirring shafts by virtue of the shearing force generated by the rotation of said stirring shafts in the presence of at least one neutralizing agent selected from the group consisting of basic substances and salts of weak acids.

20. A method according to claim 19, wherein said reaction vessel provided with said plurality of rotary shaft is a twin-arm type kneader.

21. A method according to claim 10, wherein said neutralizing agent is a basic substance.

22. A method according to claim 21, wherein said basic substance is an alkali hydroxide.

23. A method according to claim 10, wherein said neutralizing agent is a salt of weak acid.

24. A method according to claim 23, wherein said salt of weak acid is a strong alkali salt of carbonic acid.

* * * * *